United States Patent [19]
Druckman et al.

[11] Patent Number: 5,283,825
[45] Date of Patent: Feb. 1, 1994

[54] TELEPHONE ADAPTOR FOR TELEPHONE SETS

[76] Inventors: Gil Druckman, 10 Patai Street; Amnon Abiri, 5 Patai Street, both of Ramat Aviv, 69973 Tel Aviv, Israel

[21] Appl. No.: 721,079

[22] Filed: Jun. 26, 1991

[30] Foreign Application Priority Data

Feb. 15, 1991 [IL] Israel .......................... 97250

[51] Int. Cl.⁵ ............................................. H04M 3/56
[52] U.S. Cl. ..................... 379/167; 379/194; 379/160
[58] Field of Search ............... 379/184, 194, 103, 202, 379/160, 420, 167

[56] References Cited

U.S. PATENT DOCUMENTS

| | | | |
|---|---|---|---|
| 4,000,376 | 12/1976 | Springer | 379/184 |
| 4,132,869 | 1/1979 | Knox | 379/168 |
| 4,631,365 | 12/1986 | Potter et al. | 379/167 |
| 4,821,319 | 4/1989 | Middleton et al. | 379/167 |

OTHER PUBLICATIONS

Popular Mechanics "Technology Update" p. 122, Dec. 1982.
"Home Fone" by Technicom International 25 Mar. 1983.
"511E Intercom System" by ITT, 6 pages Jun. 1986.
"Businesscom II" Because No Business Deserves less Than Total Communications, Technicom International Inc. Nov. 1982.

Primary Examiner—James L. Dwyer
Assistant Examiner—Ahmad F. Matar
Attorney, Agent, or Firm—Mark M. Friedman

[57] ABSTRACT

A telephone adaptor unit for a telephone set connectible, with other like telephone adaptor units for other telephone sets, between the respective telephone set and a common telephone line, includes a first switching device effective, when an off-hook condition is detected, to connect the respective telephone set to the telephone line and to disconnect the other telephone sets from the telephone line, an audio circuit including a speaker connected to the telephone line, a second switching device for enabling the audio circuit to receive audio signals from the telephone line and to reproduce such signals via its speaker, and a control system effective to actuate the first switching device of the other telephone adaptor units to connect their respective telephone sets to the common telephone line, and to actuate the second switching device of the other telephone adaptor units to enable the audio circuit of the other telephone adaptor units to receive audio signals from the telephone line and to reproduce such signals via their speakers.

6 Claims, 3 Drawing Sheets

TELEPHONE ADAPTOR FOR TELEPHONE SETS

FIELD AND BACKGROUND OF THE INVENTION

The present invention relates to telephony, and particularly to a telephone adaptor (or jack) unit for connecting telephone sets to a telephone line.

A subscriber's telephone line usually includes a number of extensions enabling different sets to transmit and receive via the same telephone line. Many sophisticated systems are available providing, among a wide variety of various telephone functions, the function of connecting a selected extension to the telephone line, or connecting a plurality of extensions at one time to the telephone line to provide intercommunication between the extensions. However, such known sophisticated systems are generally very complicated and costly, and are therefore generally utilized only by commercial concerns, as distinguished from residential subscribers which may have but a few extensions connected to one telephone line and which do not require many of the functions of a sophisticated system.

OBJECTS AND BRIEF SUMMARY OF THE INVENTION

An object of the present invention is to provide a telephone adaptor unit particularly useful to residential subscribers to permit the telephone line to be used for many of the services now provided by sophisticated, costly telephone systems used by commercial concerns.

According to the present invention, there is provided a telephone adaptor system for a telephone set directly connectible, with one or more other like telephone adaptor systems for other telephone sets, between the respective telephone set and a common telephone line, comprising: (a) an audio circuit including an audio amplifier and a speaker connected to the telephone line; (b) a switching mechanism for enabling said audio circuit to receive audio signals from the telephone line and to reproduce such signals via said speaker for use in paging; and (c) a controller effective, when actuated, to actuate said switching mechanism of the other telephone adaptor systems to enable said audio circuit of the other telephone adaptor systems to receive audio signals from the telephone line and to reproduce such signals via their speakers.

According to preferred embodiments of the invention described below, the controller includes time delay means effective, upon actuation of the control system, to actuate said switching mechanism of the other telephone adaptor systems for a predetermined time interval.

According to further features in the described preferred embodiments, the controller further includes a line status detector effective, when detecting at least one flash hook in any of the telephone adaptor systems, to actuate said switching mechanism for said predetermined time period.

As one example, the predetermined time interval may be approximately ten seconds.

A telephone adaptor unit constructed in accordance with the foregoing features provides a number of important advantages. Thus, it enables private conversations to be had via one telephone set, which private conversations cannot be heard on the other telephone sets served by the same telephone line. In addition, the telephone adaptor unit serves as a paging system, enabling a person at one telephone set to use the built-in speaker in the adaptor unit for paging purposes. The telephone adaptor unit further permits the telephone line also to serve as a home intercommunication system wherein all the telephone sets are simultaneously connected to the telephone line.

Since the adaptor unit thus includes its own built-in speaker which may be used for paging purposes, for example, such a unit might be called a "talking jack".

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
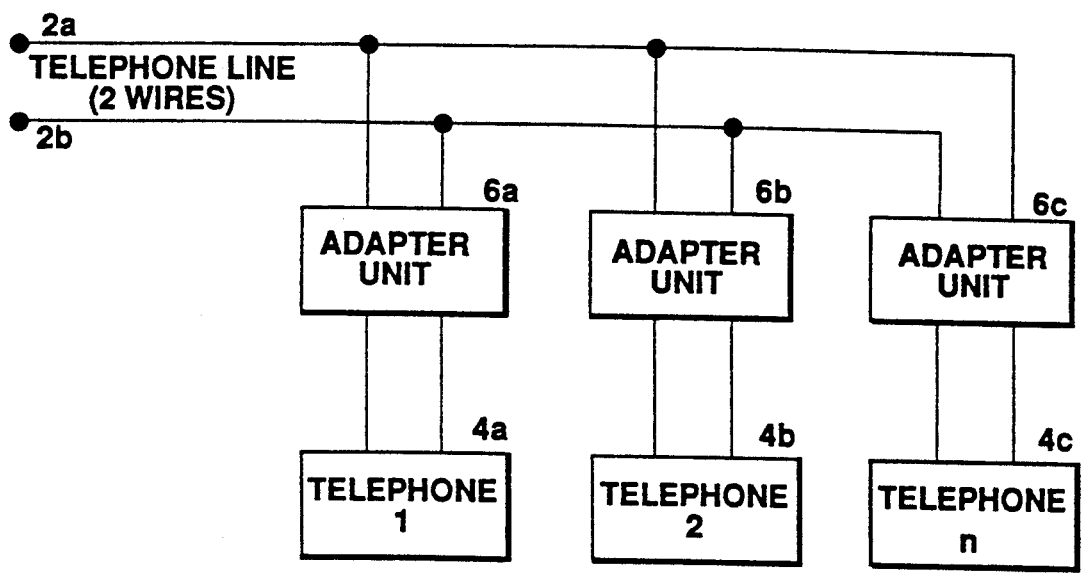
FIG. 1 is a block diagram illustrating a telephone line equipped with a plurality of telephone adaptor units constructed in accordance with the present invention.

With reference first to FIG. 1, there is illustrated a telephone line including two wires 2a, 2b, such as may be provided to a subscriber in the subscriber's home. The subscriber is further provided with a plurality of telephone sets 4a, 4b, 4c each connected or connectible to the telephone line to permit any one of the telephone sets to use the telephone line for both transmitting and receiving messsges.

In the conventional system, particularly as used by residential subscribers, the connections of the telephone sets 4a–4c to the telephone line 2a, 2b are done by wall-mounted jacks which permit each telephone set to be selectively connected to the telephone line. According to the present invention, such telephone jacks are used for receiving a telephone adaptor unit, shown at 6a, 6b and 6c in FIG. 1, for connecting the telephone sets 4a–4c to the telephone line 2a, 2b in such a manner to enable the telephone line to be used for other functions, including paging and intercommunication, as will be described below.

Figure 2:
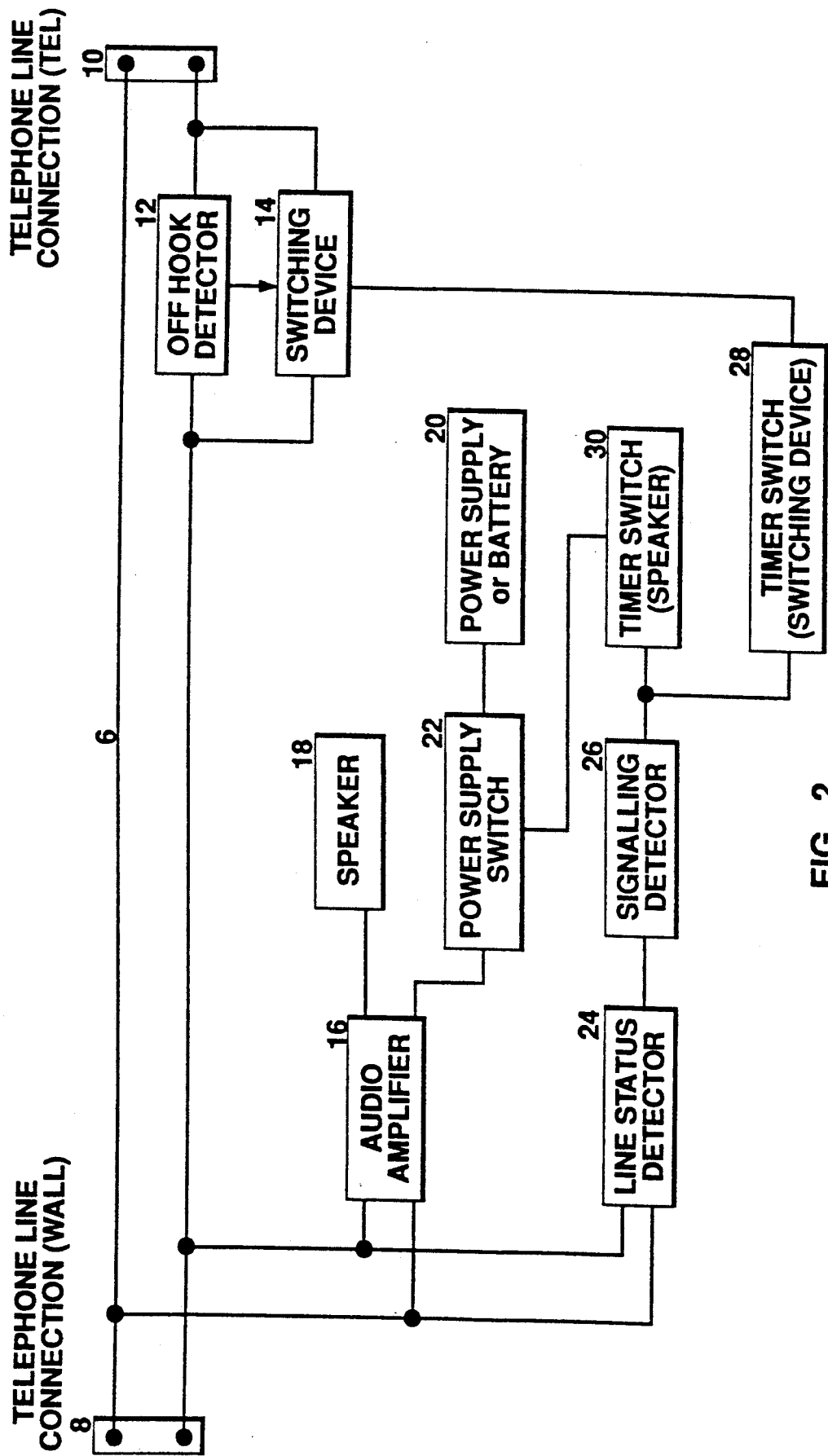
FIG. 2 is a block diagram illustrating one construction of one of the telephone adaptor units in the system of FIG. 1.

FIG. 2 illustrates one construction, generally designated 6, of one of the telephone adaptor units 6a–6c. As shown in FIG. 2, the telephone adaptor unit 6 is connected to the telephone line (2a, 2b, FIG. 1) via a wall jack 8 and to the respective telephone set (4a–4c, FIG. 1) via a telephone connection 10.

Thus, the telephone adaptor unit 6 illustrated in FIG. 2 includes an off-hook detector 12 for detecting whether the respective telephone set is off-hook, on-hook or momentarily on-hook ("flashing hook"). The off-hook detector 12 also controls a switching device 14 which, when the detector detects an off-hook condition in its respective set, connects its respective set to the telephone line and disconnects the other telephone sets from the telephone line.

For example, in the illustrated example the telephone line carries a +48 volt when all the telephone sets are in an on-hook condition. As soon as a detector 12 in one adaptor unit 6 senses an off-hook condition in its respective set, the detector actuates its switching device 14 to connect its set to the telephone line. This causes the voltage on the telephone line to drop such that the switching devices 14 in the adaptor units for the other telephone sets are disabled from connecting their respective sets to the telephone line. Thus, as soon as one telephone set goes off-hook to connect its set to the telephone line, all the other telephone sets are disconnected from the line, thereby permitting the off-hook set to use the line privately.

The telephone adaptor unit 6 illustrated in FIG. 2 further includes an audio circuit connected to the telephone line including an audio amplifier 16 and a speaker 18 driven by the amplifier. The audio amplifier 16 is energized by a power supply 20, such as a rechargeable battery, via a power supply switch 22. Normally, switch 22 is open, thereby disabling the audio circuit.

Each telephone adaptor unit 6 as illustrated in FIG. 2 further includes a line status detector 24. Detector 24 continuously detects the status of the telephone line, i.e., to determine whether all the telephone sets connected to the line are "on-hook", or whether one is "off-hook". In the illustrated example, this can be determined by sensing the voltage on the telephone line, it being +48 V in the all "on-hook" condition, and at a lower value when one of the handsets goes "off-hook".

Detector 24 particularly detects a momentarily off-hook condition, or a "flashing hook", e.g., by the user momentarily or repeatedly operating the off-hook lever of the telephone set. When such a condition is sensed by detector 24, it actuates a signalling detector 26 which in turn actuates two timers 28, 30. Timer 28 is actuated to close the switching device 14 in the respective adaptor unit for a predetermined time interval, and thereby to connect all the telephone sets to the telephone line for this predetermined time interval. Timer 30 is effective to close the power supply switch 22 connecting the power supply 20 to the audio amplifier 16, and thereby to enable the audio amplifier to drive the speaker 18 from the telephone line for another predetermined time interval.

The telephone adaptor unit illustrated in FIG. 2 operates as follows:

When all the telephone sets (4a–4c, FIG. 1) are on-hook, a +48V appears across the telephone line (2a, 2b, FIG. 1). Also, switch 22 is open so that the audio circuit including speaker 18 is disabled.

As soon as one telephone set goes off-hook, this is detected by detector 12 in the telephone adaptor unit 6 for the respective set. Detector 12 actuates its switching device 14 to connect the respective telephone set to the telephone line. When this occurs, the +48V across the line now drops, so that the switching devices 14 in the other telephone adaptor units are disabled from connecting their respective telephone sets to the line.

It will thus be seen that the telephone adaptor unit 6 enables the first telephone set which goes off-hook to seize the line and to engage in private conversations which cannot be heard on the other telephone sets.

Should a user of one of the telephone sets wish to page a person via the telephone line and the sets connected thereto, this may be done by going off-hook at one of the telephone sets, thereby connecting that set to the telephone line. But this also disconnects the other telephone sets from the line as described above. However, the off-hook set may then momentarily go on-hook or "flashing-hook", whereupon the line status detector 24 of all the other telephone sets produces an output signal via detector 26 to actuate the two timers 28 and 30. As described above, timer 28 actuates the switching device 14 in its respective adaptor unit to connect its respective telephone set to the telephone line for a predetermined time interval; and timer 30 closes the power supply switch 22, also for a predetermined time interval, thereby enabling the audio amplifier 16, receiving audio signals from the telephone line, to drive the speaker 18.

Accordingly, during the time interval of timer 30, the user of one telephone set may talk into the set in order to page a person, and the spoken words will be transmitted via the telephone line to all the other sets connected to that telephone line.

It will thus be seen that when a user momentarily or repeatedly produces an on-hook signal (a flashing signal) by the use of the respective telephone set, all the telephone sets will be connected to the telephone line and the audio circuit including amplifier 16 and speaker 18 will be actuated so as to permit paging via all the telephone sets for a predetermined time interval determined by timer 30. As one example, timer 30 may have an interval of 10 seconds, thereby permitting a person to be paged for 10 seconds after the "flashing signal".

It will also be seen that, when the "flashing signal" is produced at one telephone set, all the telephone sets are connected to the telephone line for a period of time determined by timer 28, enabling any of the other telephone sets to go off-hook and thereby to be simultaneously connected to the line so as to provide intercommunication between the sets. As one example, the period of time by timer 28 is 20 seconds. When that period of time runs out, if no other telephone set has gone off-hook, the other telephone sets are disconnected from the line; but if one other set has gone off-hook, then it remains connected to the line when the 20 seconds have elapsed.

Figure 3:
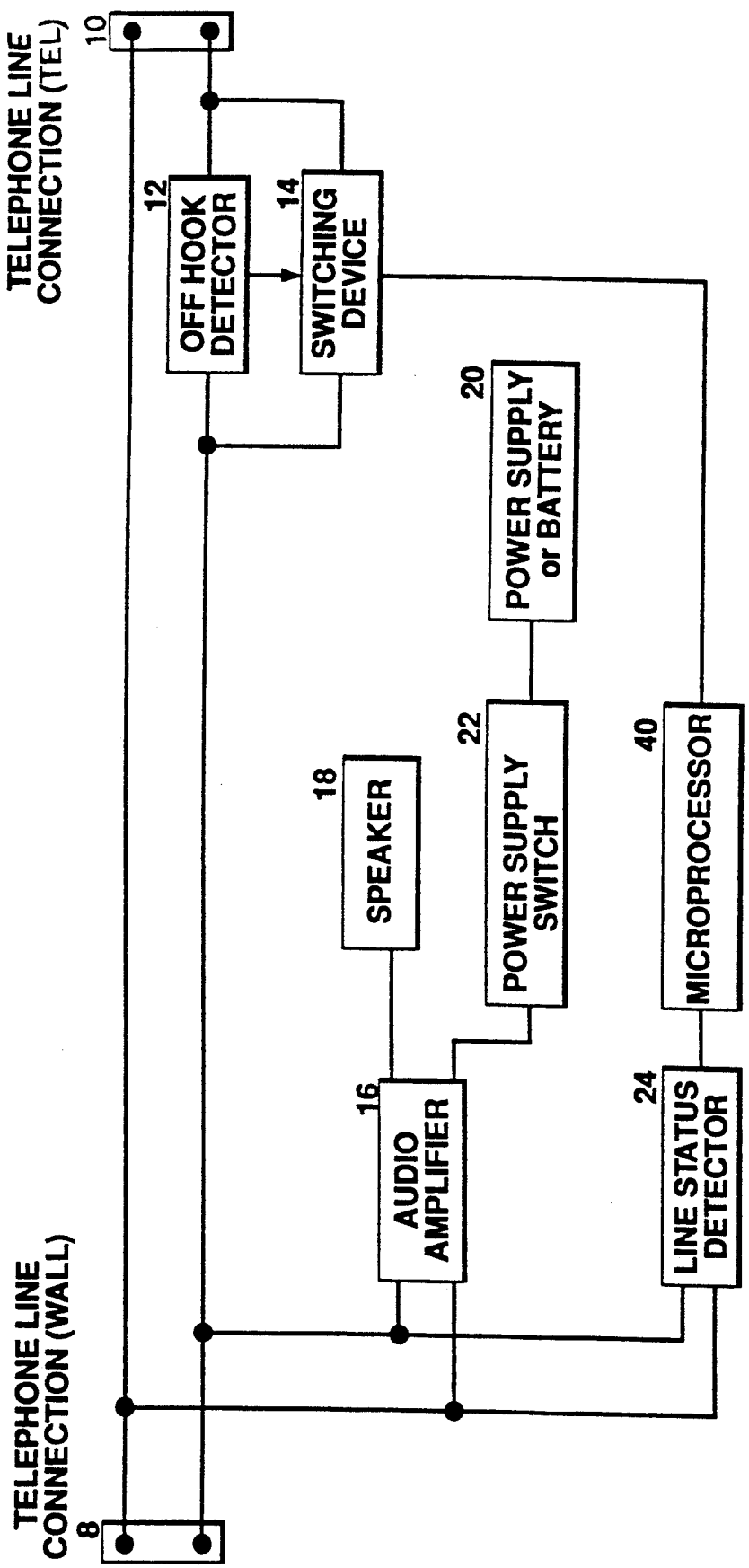
FIG. 3 is a block diagram illustrating a modification in the construction of the telephone adaptor unit of FIG. 2.

FIG. 3 illustrates a variation in the construction of the telephone adaptor unit shown in FIG. 2. The essential difference in the variation of FIG. 3 is that a microprocessor 40 is provided to perform the functions of the signalling detector 26, timer 28 and timer 30. In all other respects, the telephone adaptor unit illustrated in FIG. 3 is constructed, and operates in the same manner, as described above with respect to FIG. 2, and therefore the same reference numerals have been used to identify the corresponding elements as appearing in FIG. 2.

While the invention has been described with respect to two preferred embodiments, it will be appreciated that many other variations may be made. For example, instead of the unit being attached to an existing telephone jack, it could be constructed so as to be used instead of a conventional telephone jack or it could be incorporated in an existing telephone set. Many other variations, modifications and applications of the invention may be made.

What is claimed is:

1. A telephone adaptor system for a telephone set directly connectible, with one or more other like telephone adaptor systems for other telephone sets, between the respective telephone set and a common telephone line, comprising:

(a) an audio circuit including an audio amplifier and a speaker connected to the telephone line;
   (b) a switching mechanism for enabling said audio circuit to receive audio signals from the telephone line and to reproduce such signals via said speaker for use in paging; and (c) a controller effective, when actuated, to actuate said switching mechanism of the other telephone adaptor systems to enable said audio circuit of the other telephone adaptor systems to receive audio signals from the telephone line and to reproduce such signals via their speakers.

2. A telephone adaptor system as in claim 1, wherein said controller includes time delay means effective, upon actuation of the control system, to actuate said switching mechanism of the other telephone adaptor systems for a predetermined time interval.

3. A telephone adaptor system as in claim 2, wherein said controller further includes a line status detector effective, when detecting at least one flash hook in any of the telephone adaptor systems, to actuate said switching mechanism for said predetermined time period.

4. A telephone adaptor system as in claim 3, wherein said controller further includes a time delay circuit connected between said signal detector and said switching mechanism.

5. A telephone adaptor system as in claim 3, wherein said controller further includes a microprocessor connected between said line status detector and said switching mechanism.

6. A telephone adaptor system as in claim 1, wherein said audio circuit includes a power supply, and said switching mechanism is effective to disable said audio circuit by disconnecting same from its power supply.

* * * * *